US012489964B2

(12) United States Patent
Cao et al.

(10) Patent No.: US 12,489,964 B2
(45) Date of Patent: Dec. 2, 2025

(54) PATH PLANNING

(71) Applicant: International Business Machines Corporation, Armonk, NY (US)

(72) Inventors: Li Cao, Beijing (CN); Ze Ming Zhao, Beijing (CN); Zhan Wei Wang, Xi'an (CN); Xiao Tian Xu, Chang De (CN)

(73) Assignee: International Business Machines Corporation, Armonk, NY (US)

(*) Notice: Subject to any disclaimer, the term of this patent is extended or adjusted under 35 U.S.C. 154(b) by 403 days.

(21) Appl. No.: 17/386,003

(22) Filed: Jul. 27, 2021

(65) Prior Publication Data

US 2023/0036851 A1 Feb. 2, 2023

(51) Int. Cl.
*G06F 18/213* (2023.01)
*G06N 20/00* (2019.01)
*G06T 7/20* (2017.01)
*G06V 20/00* (2022.01)
*H04N 23/61* (2023.01)

(52) U.S. Cl.
CPC ............ *H04N 23/61* (2023.01); *G06N 20/00* (2019.01); *G06T 7/20* (2013.01); *G06V 20/00* (2022.01)

(58) Field of Classification Search
CPC .... G06N 23/61; G06N 20/00; G06V 2201/03; G06V 10/774; G06V 20/00; G06T 7/20; G06T 7/70; G06T 2207/10068; H04N 23/61; H04N 23/69
See application file for complete search history.

(56) References Cited

U.S. PATENT DOCUMENTS

| 2011/0299770 | A1* | 12/2011 | Vaddadi | G06V 10/757 382/165 |
| 2011/0301447 | A1* | 12/2011 | Park | G06T 7/0016 600/407 |
| 2016/0360120 | A1* | 12/2016 | Inoue | H04N 23/00 |
| 2017/0103532 | A1 | 4/2017 | Ghesu | |
| 2018/0032841 | A1 | 2/2018 | Kluckner | |
| 2018/0296281 | A1* | 10/2018 | Yeung | A61B 34/32 |

(Continued)

FOREIGN PATENT DOCUMENTS

CN 111128349 A 5/2020

OTHER PUBLICATIONS

Li et al., Learning A Multi-size Patch-based Hybrid Kernel Machine Ensemble for Abnormal Region Detection in Colonoscopic Images, 2005, IEEE, pp. 1-6 (Year: 2005).*

(Continued)

*Primary Examiner* — Siamak Harandi
*Assistant Examiner* — Mehrazul Islam
(74) *Attorney, Agent, or Firm* — Gavin Giraud

(57) ABSTRACT

The present invention provides a computer-implemented method, a system, and a computer program product for path planning According to the computer-implemented method, a target discriminator is selected from a set of discriminators with different kernel sizes based on a target image obtained from an image capturing device. In this case, a confidence of the target image is determined using the target discriminator. The confidence indicates whether the target image contains a target object to be captured. Thereby, a movement indication for moving the image capturing device to capture the target object is determined based on the confidence of the target image.

15 Claims, 8 Drawing Sheets

(56) References Cited

U.S. PATENT DOCUMENTS

| | | | |
|---|---|---|---|
| 2019/0147588 A1 | 5/2019 | Rowley Grant | |
| 2020/0085382 A1 | 3/2020 | Taerum | |
| 2020/0234070 A1* | 7/2020 | Hayashi | A61B 1/00045 |
| 2020/0297444 A1* | 9/2020 | Camarillo | G16H 30/40 |
| 2021/0345865 A1* | 11/2021 | Spillinger | G06T 7/0012 |

OTHER PUBLICATIONS

Alansary et al., "Evaluating reinforcement learning agents for anatomical landmark detection", Biomedical Image Analysis Group (BioMedIA), ScienceDirect, Feb. 14, 2019, 9 Pages.

Alex et al., "Generative Adversarial Networks for Brain Lesion Detection", Proceedings vol. 10133, Medical Imaging 2017: Image Processing, Feb. 24, 2017, 9 Pages.

Maicas et al., "Deep Reinforcement Learning for Active Breast Lesion Detection from DCE-MRI", International Conference on Medical Image Computing and Computer-Assisted Intervention, Sep. 4, 2017, 9 Pages.

Stember et al., "Deep reinforcement learning to detect brain lesions on MRI: a proof-of-concept application of reinforcement learning to medical images", arXiv:2008.02708 [cs.AI], Aug. 6, 2020, 20 Pages.

Vlontzos et al., "Multiple Landmark Detection using Multi-Agent Reinforcement Learning", arXiv:1907.00318v2 [cs.CV], Jul. 22, 2019, 9 Pages.

Zhou et al., "Adaptive Imaging for Lesion Detection Using a Zoom-in PET System", IEEE Transactions on Medical Imaging, vol. 30, No. 1, Jan. 2011, 12 Pages.

Mell et al., "The NIST Definition of Cloud Computing", Recommendations of the National Institute of Standards and Technology, NIST Special Publication 800-145, Sep. 2011, 7 pages.

* cited by examiner

PATH PLANNING

BACKGROUND

The present invention relates to information processing, and more specifically, to a method, system, and computer program product for path planning.

With the evolution of information technology, image capturing devices can be used to capture images for finding objects of interest. These images and/or further images captured by the image capturing devices after finding the objects can be used for further analysis of the objects. For example, medical images can be obtained from medical endoscopes to find the lesion. As another example, device images can be obtained from probes with cameras to find the defect in the device. However, the finding of the objects of interest from the images can be difficult and inaccurate.

SUMMARY

According to a first aspect of the present invention, there is provided a computer-implemented method. According to the method, a target discriminator is selected from a set of discriminators with different kernel sizes based on a target image obtained from an image capturing device. A confidence of the target image is determined using the target discriminator. The confidence indicates whether the target image contains a target object to be captured. A movement indication for moving the image capturing device to capture the target object is determined based on the confidence of the target image.

According to a second aspect of the present invention, there is provided a system. The system comprises a processing unit and a memory coupled to the processing unit and storing instructions thereon. The instructions, when executed by the processing unit, perform acts including: selecting, based on a target image obtained from an image capturing device, a target discriminator from a set of discriminators with different kernel sizes; determining, using the target discriminator, a confidence of the target image, the confidence indicating whether the target image contains a target object to be captured; and determining, based on the confidence of the target image, a movement indication for moving the image capturing device to capture the target object.

According to a third aspect of the present invention, there is provided a computer program product comprising a computer-readable storage medium having program instructions embodied therewith. The program instructions are executable by a processor to cause the processor to perform acts of: selecting, based on a target image obtained from an image capturing device, a target discriminator from a set of discriminators with different kernel sizes; determining, using the target discriminator, a confidence of the target image, the confidence indicating whether the target image contains a target object to be captured; and determining, based on the confidence of the target image, a movement indication for moving the image capturing device to capture the target object.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
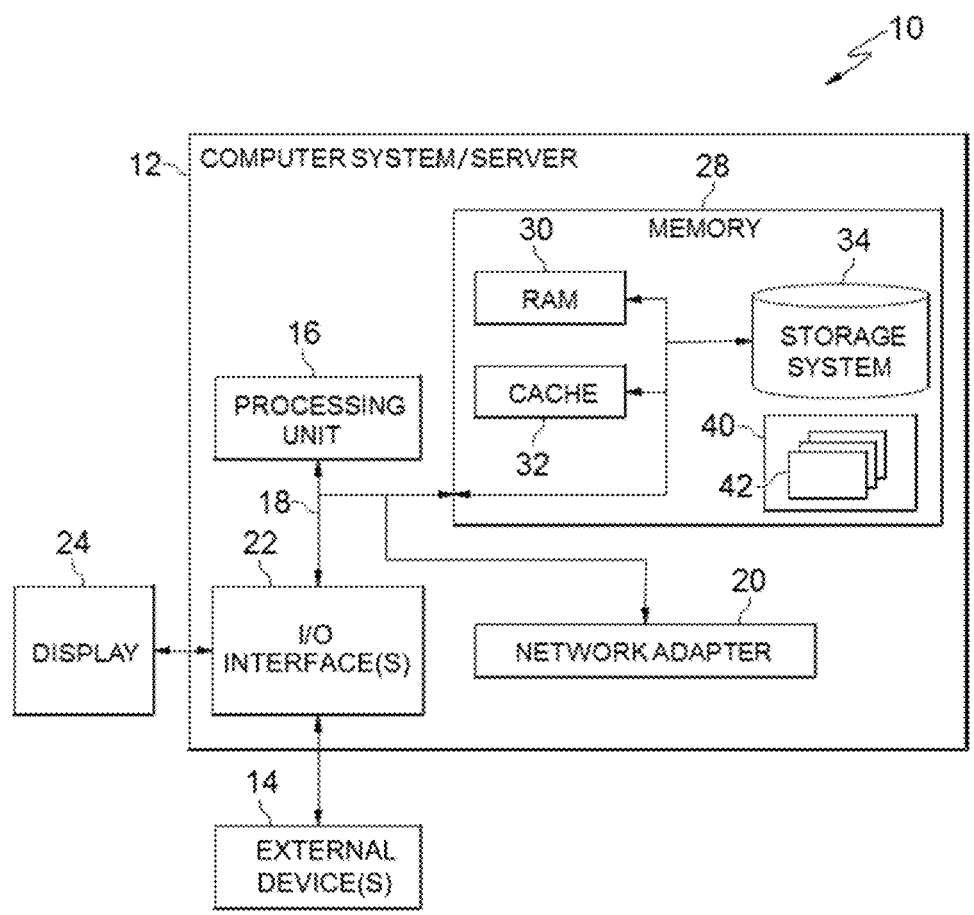
FIG. 1 depicts a cloud computing node according to an embodiment of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
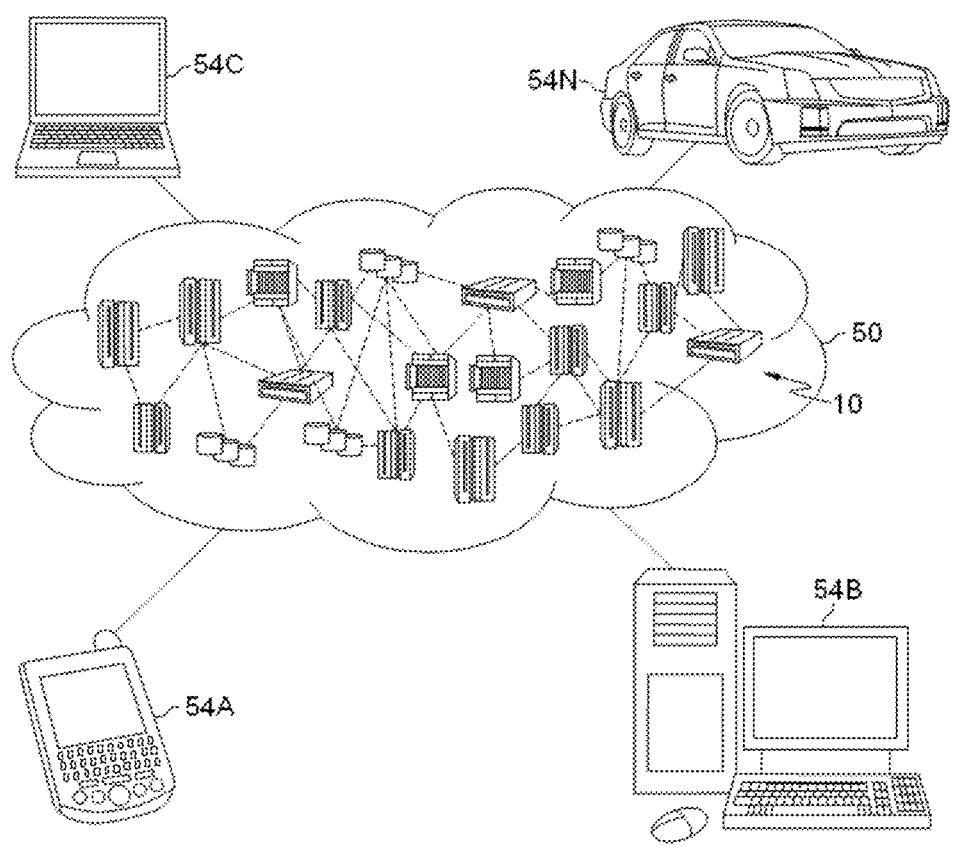
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
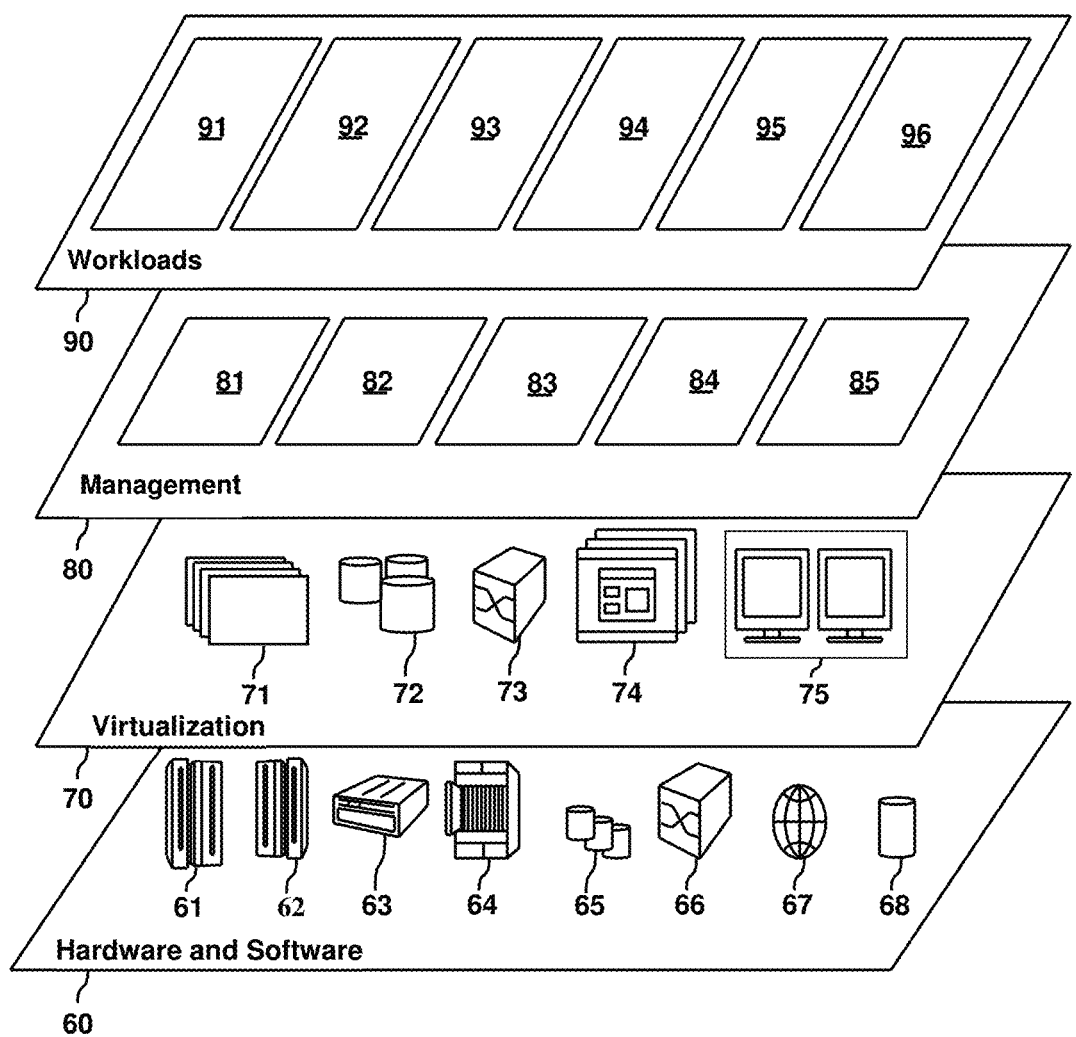
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and path planning 96.

Embodiments of the present invention recognize that the finding of objects of interest from images captured from image capturing devices can be difficult and inaccurate. Specifically, the finding of the objects highly relies on the experience of operators. In addition, the accuracy of the finding of the objects is difficult to guarantee, for example, the real lesion or defect in the image may be missed. Further, the performance of the finding of the objects is rather low, for example, the doctor or engineer might take a large amount of time to find out the lesion or the defect.

Embodiments of the present invention utilize heat maps and path planning to facilitate the finding of the objects of interest in images. By using the heat map, the path planning can learn the path to the object of interest. Embodiments of the present invention provide an improved solution for path planning Generally speaking, according to embodiments of the present invention, a target discriminator is selected from a set of discriminators with different kernel sizes based on a target image obtained from an image capturing device. In this case, a confidence of the target image is determined using the target discriminator. The confidence may take a form of a percentage, a ratio, a numeric value, etc. The confidence indicates whether the target image contains an object of interest (hereinafter, interchangeably referred to as "target object") to be captured. Thereby, a movement indication for moving the image capturing device to capture the target object is determined based on the confidence of the target image. In accordance with the path planning mechanism as proposed herein, the path planning can be more effective and robust in finding the target object.

Figure 4:
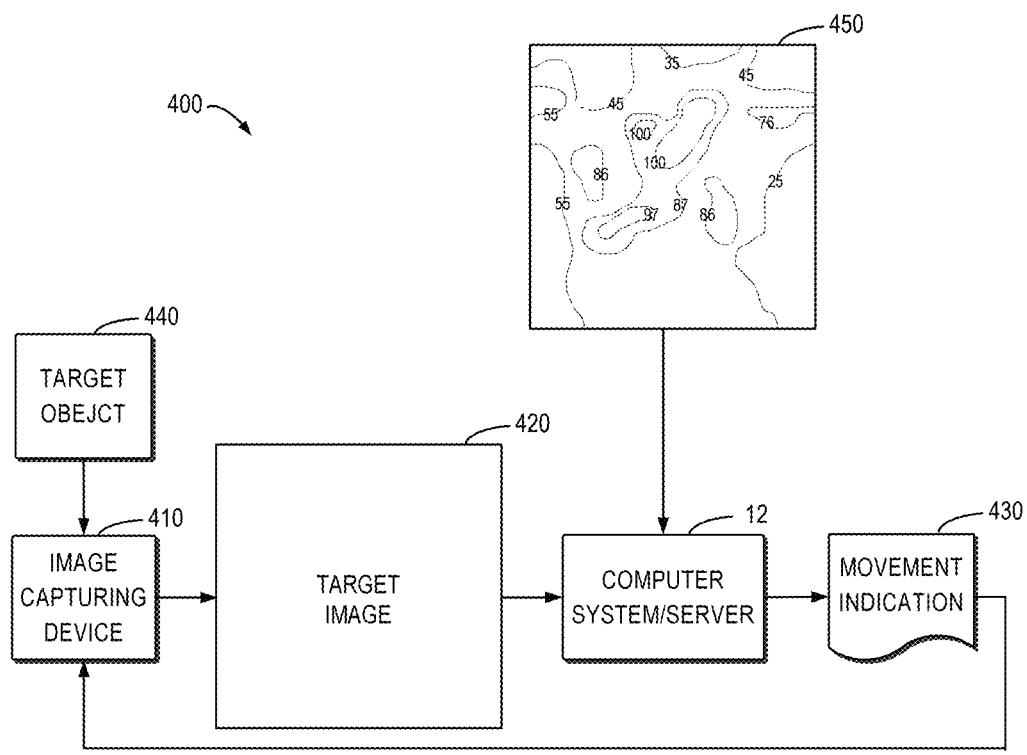
FIG. 4 depicts a schematic diagram of an example of a path planning environment in which an embodiment of the present invention can be implemented.

Now some example embodiments will be described with reference to FIGS. 4-7. FIG. 4 depicts a schematic diagram of an example of a path planning environment 400 in which an embodiment of the present invention can be implemented.

The path planning environment 400 may include the computer system/server 12 and an image capturing device 410. The image capturing device 410 can be any appropriate device that is able to capture an image, such as a medical endoscope, a probe with a camera, a camera, a smartphone, etc. As an example, the captured image can be a target image 420.

The target image 420 can be an image associated with a target object 440. For example, if the target object 440 is a lesion on the body of a patient, the target image 420 can be an image captured of the body of the patient in the process of finding the lesion. As another example, if the target object 440 is a defect in a device, the target image 420 can be an image captured in the internal space of the device in the process of finding out the defect. These examples are only used for illustrative purposes; in fact, the target image 420 can be any appropriate image and the target object 440 can be any appropriate object.

The computer system/server 12 may obtain the target image 420 from the image capturing device 410. In some embodiments, the computer system/server 12 may determine a movement indication 430. The movement indication 430 can be used for moving the image capturing device 410 to capture a further image of the target object 440. For example, the movement indication may indicate to move the image capturing device 410 up, down, left, right, or rotate in a certain angle, or move in any appropriate way, etc.

In some embodiments, the computer system/server 12 may determine the movement indication 430 based on a heat map 450 corresponding to the target image 420. The computer system/server 12 can obtain heat map 450 in parallel with the computer system/server 12 obtaining the target image 420. As an example, the heat map 450 can be a visual representation with colors, points, or lines indicating heat values. As a further example, the heat map can take other forms with or without visual representation. In some embodiments, a point in the heat map 450 can include three dimensions, in which two dimensions are the location of the point in the heat map 450, and the third dimension is represented by a heat value corresponding to the point. In some other embodiments, the heat map 450 can also be a three dimension space and a point in the heat map 450 can include more than three dimensions, in which three dimensions are the location of the point in the space of the heat map 450 and an additional dimension is represented by the heat value corresponding to the point.

In some embodiments, the location of a point in the heat map 450 can be represented by coordinates in a coordinate system. For example, captured images of same or similar types of lesions of one or more patients can be transformed to a normalized size based on location relationship of the lesions and bodies of the patients. The lesions identified in the captured images can be mapped into a coordinate system pre-set for normalized images, and coordinates in the coordinate system can be assigned to the lesions. In some embodiments, the heat map 450 can be built up previously based on history data of objects (e.g., lesions or defects) which are the same with or similar to the target object 440 (such as, the objects can be of the same or similar type of the target object 440). For example, a heat value of a point in the heat map 450 may be calculated based on history data of the objects corresponding to the target object 440 (such as, the objects of the same or similar type of the target object 440) identified at the point. As an example, each heat value of a point (such as, 25, 35, 45, 55, 76, 86, 87, 97, 100, etc. shown in the heat map 450) can represent the number of the objects corresponding to the target object 440 (such as, the objects of the same or similar type of the target object 440) historically identified at the corresponding point in the heat map 450. In this case, the heat value may be used to indicate a possible location of the target object 440 in the heat map 450. For example, the higher the heat value of a point is, the more possible the target object 440 may be identified at the point.

For instance, it is assumed that the heat map 450 relates to the body of the patient or the device. In this case, the hot region with high heat values (for example, the region with heat values higher than 90) in the heat map 450 may relate to the lesion or the defect. In contrast, the cold region with low heat values (for example, the region with heat values lower than 90) in the heat map 450 may be irrelevant to the lesion or the defect. For example, the cold region may relate to the healthy body part or the undamaged part of the device.

In determining the movement indication 430, the computer system/server 12 may use a generator for generating the movement indication 430. In addition, the computer system/server 12 may also use discriminator(s) for evaluating the movement indication 430.

The generator and/or the discriminator(s) can be implemented by any appropriate model, such as a Q-learning model or a Kernighan-Lin model. In addition, the generator and/or the discriminator(s) can be deployed in the computer system/server 12 or deployed in any other appropriate device accessible to the computer system/server 12. Further, the generator and the discriminator(s) may be trained in advance by the computer system/server 12 or any other appropriate device.

The computer system/server 12 may cause the image capturing device 410 to move according to the movement indication 430 to capture a further target image. In some embodiments, a further target discriminator corresponding to the further target image may determine confidence of the further target image, and the confidence of the further target image may be applied as a reward to the generator to optimize determination of movement indications. This process may iterate until a target image finally captured is determined to contain the target object 440 (such as, a confidence of the target image finally captured complies with a pre-set condition) or until another pre-set termination condition is met (such as, the total moving times exceed a pre-set threshold, the total moving distance exceeds a pre-set threshold, etc.). In this way, the image capturing device 410 may automatically approach the target object 440.

For example, in a medical scenario, the medical endoscope can automatically capture the lesion according to the movement indication 430 in a more effective and accurate way. As another example, in an engineering scenario, the probe can automatically capture the defect in the device according to the movement indication 430 more effectively and accurately.

The above text describes the path planning environment 400. The determination of the movement indication 430 will be described in detail below with reference to FIGS. 5-6.

Figure 5:
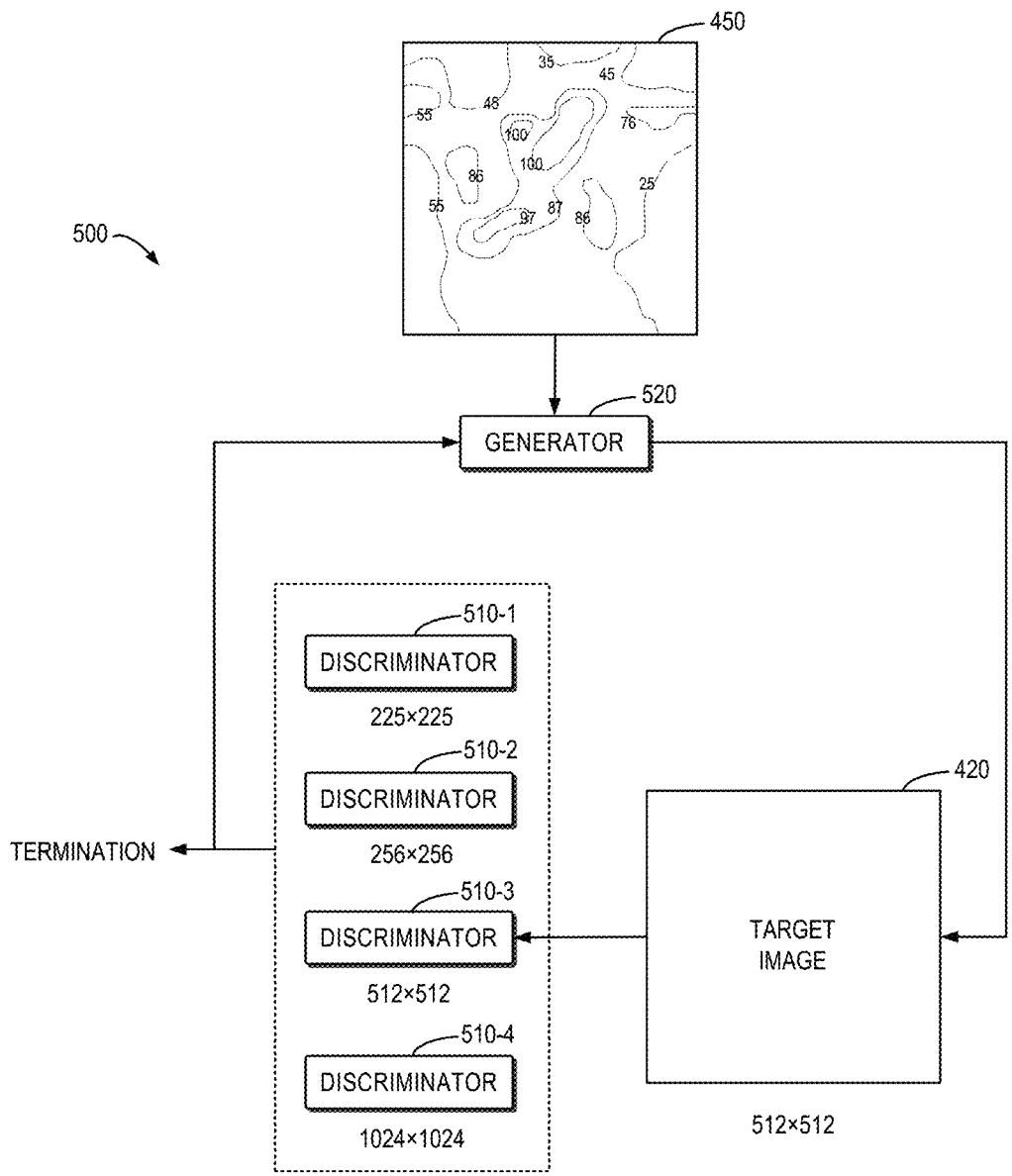
FIG. 5 depicts a schematic diagram of an example of path planning according to an embodiment of the present invention.

FIG. 5 depicts a schematic diagram of an example of path planning 500 according to an embodiment of the present invention. As shown in FIG. 5, there are a set of discriminators with different kernel sizes, such as discriminator

510-1 with the kernel size of 225×225, discriminator 510-2 with the kernel size of 256×256, discriminator 510-3 with the kernel size of 512×512, and discriminator 510-4 with the kernel size of 1024×1024. Hereinafter, discriminators 510-1 to 510-4 may collectively be referred to as "discriminator 510." It should be understood that, although four discriminators 510 are shown in FIG. 5, there may be more or less discriminators 510. In fact, the number of the discriminators may be any appropriate number.

The discriminator 510 may determine a confidence of the target image 420, in which the confidence indicates whether the target image 420 contains the target object 440 to be captured. The set of discriminators with different kernel sizes are used for target images with different sizes. This is because the computer system/server 12 may obtain the heat map 450 corresponding to the target image 420 and cause the image capturing device 410 to zoom in to scan a hot region in the heat map 450 to capture the target object 440. The hot region may represent a region with heat values higher than the surroundings, such as other regions in the heat map 450. Alternatively, the hot region may represent a region with heat values higher than a predetermined threshold, such that the average heat value in the local hot region may be higher than the predetermined threshold.

The image (for example, with the size of 256×256) captured by the image capturing device 410 after zooming in can be larger in size than the image (for example, with the size of 225×225) captured before zooming in, so as to scan the hot region more carefully. In this case, the discriminator with a larger kernel size may be used for determining the confidence of the image captured after zooming in, so as to determine whether this image contains the target object 440.

If a discriminator identifies the target object 440, the computer system/server 12 may determine the movement indication 430 as indicating terminating moving the image capturing device 410. However, if a discriminator with a certain kernel size (such as 256×256) fails to identify the target object 440, the image capturing device 410 will continue to zoom in. If discriminators with all the kernel sizes failed to identify the target object 440, the computer system/server 12 may cause the image capturing device 410 to move to another position.

In some embodiments, the target image 420 containing the target object 440 may include the target image 420 focusing on the target object 440. The target image 420 focusing on the target object 440 may indicate that the part of the target image 420 occupied by the target object 440 exceeds a threshold ratio, or the size of the target object 440 shown in the target image 420 exceeds a threshold size, etc. In some embodiments, the more likely the target image 420 contains the target object 440, the higher the confidence will be.

The discriminator 510 can be trained before being used to determine the confidence of the target image 420. In the training process, a set of training images may be used to train the discriminator 510. Each training image can have a tag indicating whether this training image contains the target object, or have a tag indicating a part of the training image relates to the target object. The discriminator 510 can be trained such that the accuracy or recall rate for the discriminator 510 to correctly determine whether the training images containing the target object can exceed a predetermined threshold. A well-trained discriminator 510 with an accuracy or recall rate exceeding the predetermined threshold can then be used to determine the confidence of the target image 420. Discriminators with different kernel sizes may be trained with training images with different sizes. For example, the discriminator with the kernel size of 256×256 can be trained with training images with the size of 256×256, and the discriminator with the kernel size of 512×512 can be trained with training images with the size of 512×512.

The computer system/server 12 may select, based on the target image 420, a target discriminator from the set of discriminators. In some embodiments, the target discriminator being selected may have a kernel size matching a size of the target image 420. For example, it is assumed that the size of the target image 420 is 512×512. In this case, the discriminator 510-3 that has a kernel size of 512×512 may be selected as the target discriminator. In some embodiments, the size of the target image 420 may not exactly match the kernel size of the discriminator 510. In this case, the computer system/server 12 may select a discriminator 510 with a kernel size approximating the size of the target image 420. For example, it is assumed the size of the target image 420 is 480×480, the discriminator 510-3 that has a kernel size of 512×512 may be selected as the target discriminator.

The computer system/server 12 may determine, using the target discriminator, the confidence of the target image 420. For example, the computer system/server 12 may apply the target image 420 to the target discriminator to determine the confidence.

The computer system/server 12 may determine, based on the confidence of the target image 420, a movement indication 430 for moving the image capturing device 410 to capture the target object 440.

In some embodiments, if the confidence of the target image 420 is higher than or equal to a threshold confidence, the computer system/server 12 may determine the movement indication 430 as indicating terminating moving the image capturing device 410. This is because the confidence higher than the threshold confidence reaches a requirement to guarantee that the target image 420 contains the target object 440. The threshold confidence can be determined according to historical experience, such as 0.90 or 90%, etc. In this case, the image capturing device 410 no longer needs to move, and can stay at the current position and/or angle. The target image 420 or any further image(s) captured by the image capturing device 410 at the current position and/or angle can be used in the further analysis. For example, the target image 420 or any further image(s) of the lesion captured by the medical endoscope can be further used to identify the disease. In another embodiment, the target image 420 or any further image(s) of the defect captured by the probe can be further used to identify the specific problems occurring in the device.

In some embodiments, if the confidence of the target image 420 is lower than the threshold confidence, the computer system/server 12 may determine the movement indication 430 as indicating a path for moving the image capturing device 410, so as to capture the target object 440.

In some embodiments, the computer system/server 12 may determine, using a generator 520, the movement indication 430 as indicating a path for moving the image capturing device 410. For example, the generator 520 may consider (apply) various factors based on machine learning models (such as, Q-learning models, Kernighan-Lin models, etc.) in determining the movement indication 430, or more specifically the path for moving the image capturing device 410. These factors may include a plurality of weights associated with a plurality of candidate movement indications. In some embodiment, these factors may also include a current status of the image capturing device 410, and/or a reward to the generator 520 for determination of a previous movement indication. The generator 520 may assign different weights to different candidate movement indications. The weight may be associated with a possibility that the image capturing device 410 might captures an image containing the target object 440 after moving according to a corresponding candidate movement indication. In some embodiment, the candidate movement indication with a relative high weight (such as, with the highest weight, with a weight higher than that of a percentage of other candidate movement indications, or with a weight higher than a pre-set threshold) can be selected by the generator 520 as the movement indication 430. The computer system/server 12 may cause the image capturing device 410 to move according to the movement indication 430 to capture a further target image. The confidence of the further target image may be applied as a reward to the generator 520 to optimize determination of movement indications. As an example, a reward function of a machine learning model of the generator 520 can be set based on the confidence of the further target image.

In some embodiments, the generator 520 may collects a current status of the image capturing device 410, including a current position and/or angle of the image capturing device 410, etc. The generator 520 may apply the current status of the image capturing device 410 in determining the movement indication 430. The current position and/or angle of the image capturing device 410 can be determined based on the target image 420 or data collected by position and/or angle sensors of the image capturing device 410. The current position and angle of the image capturing device 410 may also be inputted by users of the image capturing device 410. The current position can then be mapped to a point in the heat map 450, which can be referred to as "current point".

In some embodiments, the generator 520 may select a path for moving the image capturing device 410 from the current point to an end point with the highest heat value or to a point with a heat value higher than a pre-set threshold for a candidate movement indication. In some further embodiments, the generator 520 may select a path for moving the image capturing device 410 from the current point with a pre-set step length in a direction directing to a hot region (or an end point with the relative high heat value) for a candidate movement indication. In some further embodiments, the generator 520 may select a path for moving (rotating) the image capturing device 410 from the current angle to a new angle to cover a new group of points with a relatively large average of heat values for a candidate movement indication. For example, due to the size of the captured images and the capturing angle, the image capturing device 410 may only cover some points in the heat map 450 at the current angle. If the image capturing device 410 is moved (rotated) to a new angle, it may cover a new group of points in the heat map 450. A path for moving the image capturing device 410 from the current angle to the new angle can be selected for a candidate movement indication. In some further embodiments, the generator 520 may select a path for a candidate movement indication based on any appropriate approach (such as, machine learning models trained to select paths, etc.) to achieve more effective and efficient selection. In some further embodiments, the generator 520 may select a path randomly for a candidate movement indication.

In some embodiments, the generator 520 may calculate a weight associated with a candidate movement indication based on the heat values in the heat map 450 corresponding to the target image 420 along a path indicated by the candidate movement indication. As an example, a path may cover a group of points (such as, a current point, an end point of moving, and intermediate points, etc.) in the heat map 450. As a further example, a path for moving (rotating) the image capturing device 410 from the current angle to a new angle may cover a group of points in the heat map 450. For example, the weight may be determined based on the average of heat values of the group of points covered by the path, or the proportion of heat values of the group of points covered by the path exceeding a threshold value, etc. The higher the average, or proportion is, the higher the weight may be. The average of heat values or the proportion of heat values can be applied as the weight directly. The weight can also be derived from the average of heat values or the proportion of heat values. For example, the average of heat values can be transformed to a range from 0 to 1 to get the weight.

In some embodiments, the generator 520 may apply the confidence of the target image 420 in the assignment of the weights. For example, based on the confidence of the target image 420, the generator 520 may apply different policies to assign weights to the candidate movement indications. In an example, if the confidence locates in a pre-set interval relatively close to the threshold confidence, the generator 520 may assign a relatively high weight to the candidate movement indication indicating a path for moving the image capturing device 410 slightly (such as, moving the image capturing device 410 in a relatively short step length or rotating the image capturing device 410 in a relatively small angle, etc.).

Figure 6:
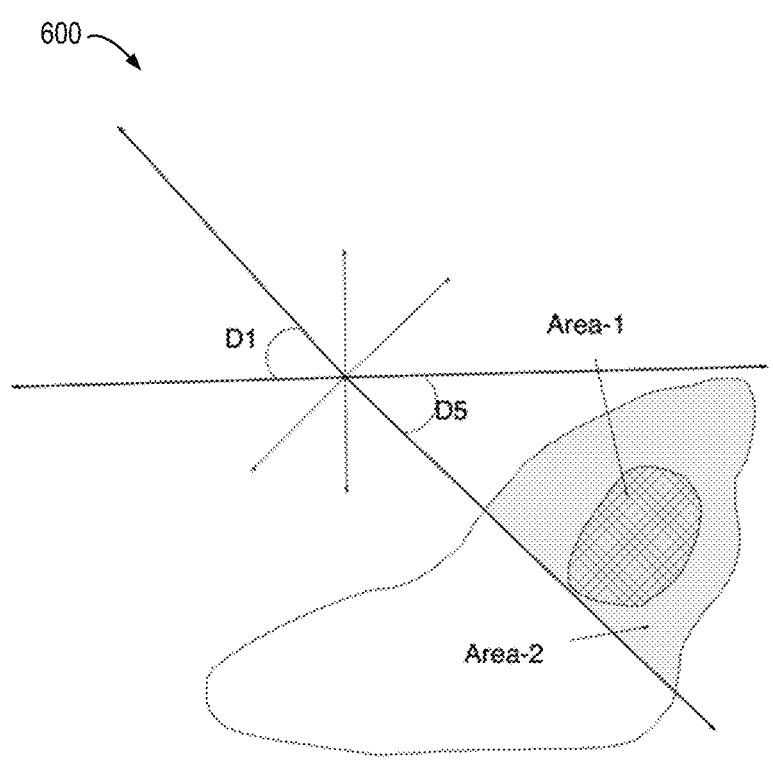
FIG. 6 depicts a schematic diagram of an example of the determination of weights according to an embodiment of the present invention.

FIG. 6 depicts a schematic diagram 600 of an example of the determination of weights according to an embodiment of the present invention. In some embodiments, the possible moving directions of the current position can be divided into a plurality of sectors. In some embodiments, the movement indication 430 may indicate a path for moving the image capturing device 410 from the current position with a pre-defined step length in a direction of the plurality of sectors. As shown in FIG. 6, there are eight sectors, and each of them can be 45 degrees. The sector for direction 1 (D1) does not contain any hot region, while the sector for direction 5 (D5) contains a large hot region. In order to improve the performance of the path planning, different weights may be assigned to different directions. In this case, a path following a certain direction or fall within a certain sector may also be assigned with a weight corresponding to that direction or sector.

In order to determine the weights, the computer system/server 12 may first determine a score for each direction. In some embodiments, the score of a certain direction can be the sum of sizes of the areas (such as, Area-1, Area-2, etc. as shown in schematic diagram 600) of different hot levels in the direction. In addition, in order to differentiate the different contributions of the different hot levels, each hot level may be assigned with a certain coefficient, such that an area having a high hot level may derive a high score. For example, it is assumed that hot level 1 represents the highest hot level, while hot level 4 represents the lowest hot level, and the coefficients for the hot levels 1-4 may be 1, 0.8, 0.3 and 0, respectively.

For example, the score can be determined based on the following equation (1):

$$\text{Score}(D) = c_1 \cdot \text{Area}_1 + c_2 \cdot \text{Area}_2 + \ldots + c_n \cdot \text{Area}_n \quad (1)$$

wherein Score(D) represents the score of a certain direction; $c_1$-$c_n$, represents the predetermined coefficients for hot level 1–n, respectively, in which hot level 1 represents the highest hot level, while hot level n represents the lowest hot level; $Area_1$-$Area_n$ represent, respectively, the area size for the hot level 1-n (such as, size of areas belonging to each level, or number of points comprised in areas belonging to each level, etc.).

In some embodiments, the weight of a candidate movement indication indicating a path for moving the image capturing device 410 from the current position with a pre-defined step length in a direction may be determined based on the score calculated for the direction. For example, if the score is larger than or equal to a predetermined threshold, the weight may be 1. Otherwise, if the score is lower than the predetermined threshold, the weight may be 0. Alternatively, the weight may be the score directly, or derived from the score, for example, the score 80 may result in the weight 0.8, while the score 15 may result in the weight 0.15.

Figure 7:
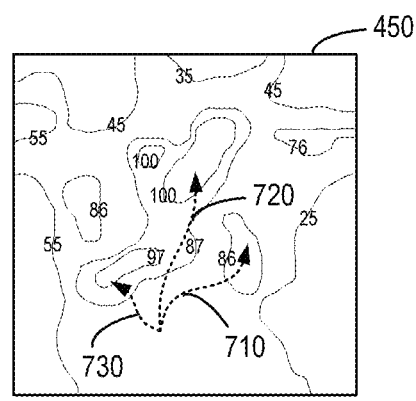
FIG. 7 depicts a schematic diagram of an example of candidate movement indications according to an embodiment of the present invention.

FIG. 7 depicts a schematic diagram of an example of candidate movement indications according to an embodiment of the present invention. As shown in FIG. 7, three candidate movement indications 710-730 indicate three paths for moving the image capturing device 410, respectively. As an example, a path indicated by one of the candidate movement indications 710-730 may cover one or more points (such as, current point, end point, intermediate point, etc.) in the heat map 450. As another example, a path indicated by one of the candidate movement indications 710-730 may be moving the image capturing device 410 from the current point with a pre-defined step length in a direction.

In some embodiments, if the average, or proportion of the heat values of the points along the path indicated by the candidate movement indication 720 is higher than that of the heat values along the paths indicated by the candidate movement indications 710 and 730, the candidate movement indication 720 may be assigned with a higher weight. In some other embodiments, if a path indicated by one of the candidate movement indications 710, 720 and 730 is moving from the current point with a pre-defined step length in a direction, the weight of the one of the candidate movement indications 710, 720 and 730 can be determined based on the method described with FIG. 6. In some embodiments, if the candidate movement indication 720 has a weight higher than weights of the candidate movement indications 710 and 730, the candidate movement indication 720 can be selected by the computer system/server 12 as the movement indication 430.

Figure 8:
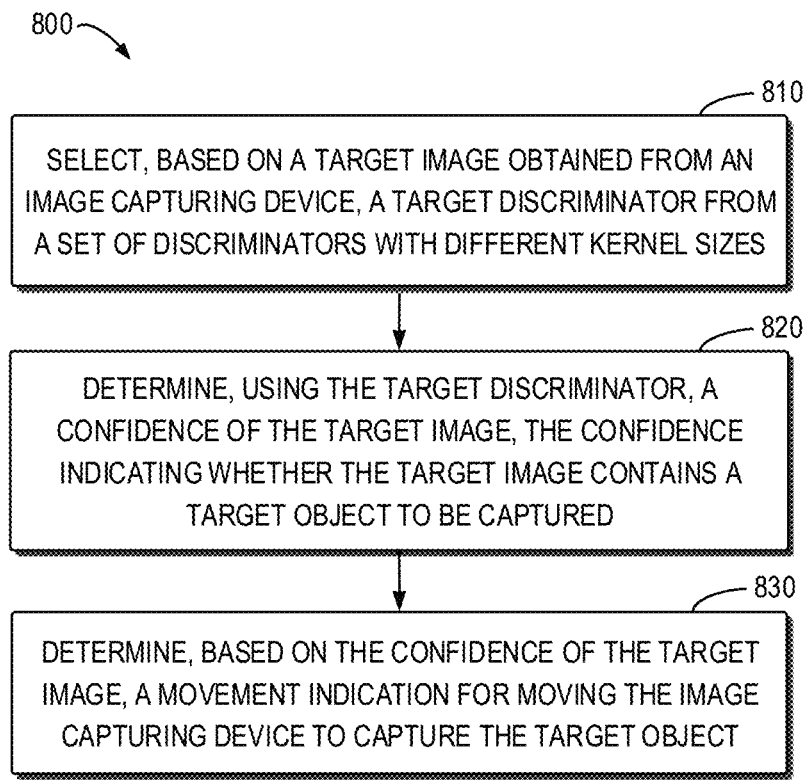
FIG. 8 depicts a flowchart of an example of path planning according to an embodiment of the present invention.

FIG. 8 depicts a flowchart of an example of path planning according to an embodiment of the present invention. The method 800 may be at least in part implemented by the computer system/server 12, or other suitable systems.

At 810, the computer system/server 12 selects, based on a target image obtained from an image capturing device, a target discriminator from a set of discriminators with different kernel sizes.

At 820, the computer system/server 12 determines, using the target discriminator, a confidence of the target image. The confidence indicates whether the target image contains a target object to be captured.

At 830, the computer system/server 12 determines, based on the confidence of the target image, a movement indication for moving the image capturing device to capture the target object.

In some embodiments, the computer system/server 12 may select, from the set of discriminators, a discriminator having a kernel size matching a size of the target image as the target discriminator.

In some embodiments, in accordance with the confidence of the target image being higher than or equal to a threshold confidence, the computer system/server 12 may determine the movement indication as indicating terminating moving the image capturing device.

In some embodiments, in accordance with the confidence of the target image being lower than a threshold confidence, the computer system/server 12 may determine the movement indication as indicating a path for moving the image capturing device.

In some embodiments, the computer system/server 12 may determine, based on a plurality of weights associated with a plurality of candidate movement indications, the movement indication. A weight may be associated with a possibility that the image capturing device captures an image of the target object after moving according to a corresponding candidate movement indication.

In some embodiments, the computer system/server 12 may determine the weight based on heat values in a heat map corresponding to the target image along a path indicated by the candidate movement indication. The heat values may be calculated based on history data of one or more objects corresponding to the target object. The one or more objects can be of the same or similar type of the target object captured at points in the heat map.

In some embodiments, the computer system/server 12 may cause the image capturing device to move according to the movement indication to capture a further target image.

In some embodiments, the computer system/server 12 may implement the determining of the movement indication using a machine learning model, and a confidence of the further target image is applied as a reward in the machine learning model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  determining, by one or more processors, a kernel size approximating a size of a target image from an image capturing device;
  selecting, by one or more processors, a target discriminator from a set of discriminators with different kernel sizes selected as a set for capturing objects at different sizes, wherein the target discriminator is selected based on the kernel size;
  determining, by the one or more processors, using the target discriminator, a confidence of the target image, the confidence indicating whether the target image contains a target object to be captured;
  responsive to the confidence of the target image being lower than a threshold confidence, determining, by the one or more processors, a movement indication is needed to indicate a path for moving the image capturing device;
  determining a plurality of candidate movement indications in directions from a current point along which the image capturing device could move; and
  determining, by the one or more processors, a plurality of weights associated with the plurality of candidate movement indications, a weight of the plurality of weights being associated with a possibility that the image capturing device captures an image of the target object after moving according to a corresponding candidate movement indication.

2. The method of claim 1, wherein selecting the target discriminator comprises:
   selecting, by the one or more processors, from the set of discriminators, a discriminator having a kernel size matching a size of the target image as the target discriminator.

3. The method of claim 1, further comprising
   in accordance with the confidence of a second target image being higher than or equal to a threshold confidence, determining, by the one or more processors, the movement indication is not needed indicating terminating moving the image capturing device.

4. The method of claim 1, further comprising:
   for each of the plurality of candidate movement indications:
      determining, by the one or more processors, the weight based on heat values in a heat map corresponding to the target image along the path indicated by the candidate movement indication, wherein the heat values are calculated based on history data of one or more objects corresponding to the target object.

5. The method of claim 1, further comprising:
   causing, by the one or more processors, the image capturing device to move according to the movement indication to capture a further target image.

6. The method of claim 5, wherein a confidence of the further target image is applied as a reward in a machine learning model.

7. A system, comprising:
   a processing unit; and
   a memory coupled to the processing unit and storing instructions thereon, the instructions, when executed by the processing unit, performing acts including:
      determining a kernel size approximating a size of a target image from an image capturing device;
      selecting a target discriminator from a set of discriminators with different kernel sizes selected as a set for capturing objects at different sizes, wherein the target discriminator is selected based on the kernel size;
      determining, using the target discriminator, a confidence of the target image, the confidence indicating whether the target image contains a target object to be captured;
      responsive to the confidence of the target image being lower than a threshold confidence, determining a movement indication is needed to indicate a path for moving the image capturing device;
      determining a plurality of candidate movement indications in directions from a current point along which the image capturing device could move; and
      determining a plurality of weights associated with the plurality of candidate movement indications, a weight of the plurality of weights being associated with a possibility that the image capturing device captures an image of the target object after moving according to a corresponding candidate movement indication.

8. The system of claim 7, wherein selecting the target discriminator comprises:
   selecting, from the set of discriminators, a discriminator having a kernel size matching a size of the target image as the target discriminator.

9. The system of claim 7, wherein determining whether the movement indication is needed comprises:
   in accordance with the confidence of the target image being higher than or equal to a threshold confidence, determining the movement indication is not needed indicating terminating moving the image capturing device.

10. The system of claim 7, further comprising:
    for each of the plurality of candidate movement indications:
       determining the weight based on heat values in a heat map corresponding to the target image along the path indicated by the candidate movement indication, wherein the heat values are calculated based on history data of one or more objects corresponding to the target object.

11. The system of claim 7, wherein the acts further comprise:
    causing the image capturing device to move according to the movement indication to capture a further target image.

12. The system of claim 11, wherein a confidence of the further target image is applied as a reward in the machine learning model.

13. A computer program product, comprising a computer-readable storage medium having program instructions embodied therewith, the program instructions executable by a processor to cause the processor to perform acts including:
    determining a kernel size approximating a size of a target image from an image capturing device;
    selecting a target discriminator from a set of discriminators with different kernel sizes selected as a set for capturing objects at different sizes, wherein the target discriminator is selected based on the kernel size;
    determining, using the target discriminator, a confidence of the target image, the confidence indicating whether the target image contains a target object to be captured;
    responsive to the confidence of the target image being lower than a threshold confidence, determining a movement indication is needed to indicate a path for moving the image capturing device;
    determining a plurality of candidate movement indications in directions from a current point along which the image capturing device could move; and
    determining a plurality of weights associated with the plurality of candidate movement indications, a weight of the plurality of weights being associated with a possibility that the image capturing device captures an image of the target object after moving according to a corresponding candidate movement indication.

14. The computer program product of claim 13, wherein selecting the target discriminator comprises:
    selecting, from the set of discriminators, a discriminator having a kernel size matching a size of the target image as the target discriminator.

15. The computer program product of claim 13, wherein determining whether the movement indication is needed comprises:
    in accordance with the confidence of the target image being higher than or equal to a threshold confidence, determining the movement indication is not needed indicating terminating moving the image capturing device.

* * * * *